Oct. 6, 1964 C. B. GWYN, JR 3,151,385

METHOD OF FORMING ELECTRICAL CONTACTS

Filed Oct. 3, 1962

INVENTOR.
CHILDRESS B. GWYN, JR.

BY

OSTROLENK, FABER, GERB & SOFFEN

ATTORNEYS 3,151,385

METHOD OF FORMING ELECTRICAL CONTACTS

Childress B. Gwyn, Jr., Export, Pa., assignor to Gibson Electric Company, Delmont, Pa., a corporation of Pennsylvania Filed Oct. 3, 1962, Ser. No. 228,116
3 Claims. (Cl. 29—155.55)

Figure 1:
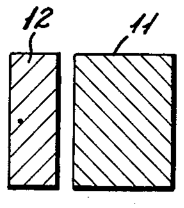

This invention relates to a method for forming integral make and break electrical contact elements, and more particularly to such a method for producing integrally bonded contacts having silver-cadmium oxide contact faces and copper backing members.

It is well known that bonding and/or brazing of silver-cadmium oxide electrical contact faces to copper supports therefor is extremely difficult. In order to obtain satisfactory bonding of such a contact face to the supporting member it is at present necessary to resort to various relatively expensive chemical treatments for modifying the silver-cadmium oxide surface to be bonded. Hence hydrogen or other reducing media have been employed to reduce the cadmium oxide content of the contact face to cadmium, or electrolytic treatments have been adopted for plating the silver-cadmium oxide surface with silver, copper or the like. Although in many instances such procedures produce satisfactory bondable surfaces, they are difficult to control to produce uniform surface characteristics, and the resulting contacts are subject to frequent separation or parting of the main silver-cadmium oxide body from the prepared surface, particularly during brazing or when the contact is subject to subsequent electro-mechanical and thermal stresses.

It is accordingly among the objects of the present invention to provide a method of rapidly and permanently bonding silver-cadmium oxide contact faces to copper or copper alloy backing members, the resulting contact elements not parting or separating when subjected to substantial stresses.

A further object of the invention is to provide such a method which may be performed rapidly and repetitively in the mass production of contact elements, at substantial economies as compared with previously known procedures.

It has been found, in accordance with the invention, that an integral make-and-break contact element is produced by confining a silver-cadmium oxide contact face member and a copper backing member in aligned relation within a compression chamber, and by subsequently subjecting the aligned contact face and backing members to a compressive force of at least 1 ton per square inch, the force being rapidly applied to the aligned members by a ram or header member at a velocity of at least about 10 inches per second, thereby forming the integrally bonded composite contact element.

When the silver-cadmium oxide contact face and copper backing member are ordinarily pressed together, the desired integral bond between such members is not produced. Surprisingly, it is only when the aligned contact members are forced together, utilizing the combination of pressure and velocity conditions described, that a substantially simultaneous flow or distortion of the members occurs and a bonding or welding at their interfacial surfaces occurs, producing an integral, firmly interlocked product.

It is believed that, when the contact members are subjected to the high impact produced by the application of pressures of at least 1 ton per square inch at rates of at least 10 inches per second, the prevailing temperature at the interface between the silver-cadmium oxide contact face member and the copper backing member increases from ambient or room temperatures e.g., about 70° F. to from about 1,000° C. to 3,000° C. It is thought that such elevated temperature is maintained only momentarily but sufficiently long to result in the formation of a monolayer atomic bond between the members. It will, however, be understood that the present invention is not limited to this proposed explanation of its operation.

Figure 2:
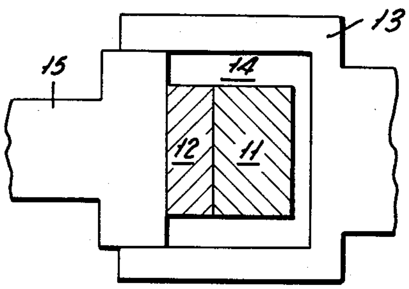
Figures 3, 4:
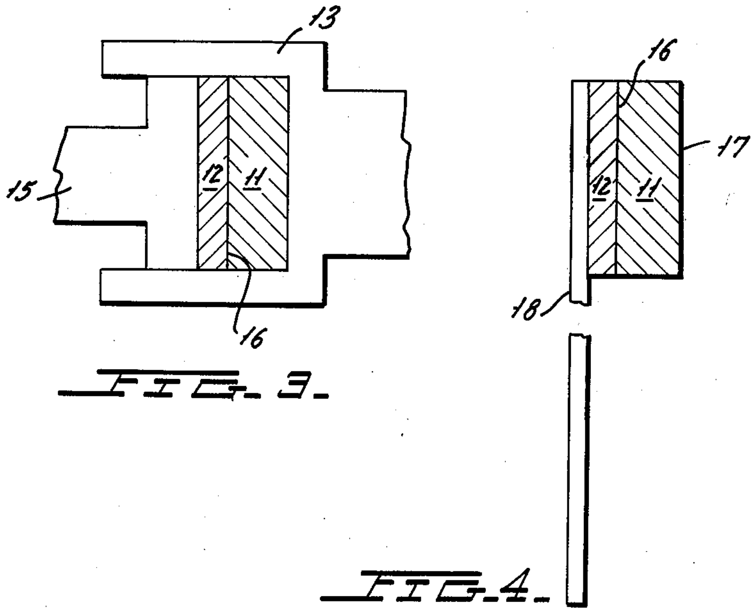

For a fuller understanding of the nature and objects of the invention, reference is made to the following detailed description of the practice of a preferred embodiment thereof, taken in connection with the accompanying drawing in which:

FIGURES 1, 2 and 3 are schematic sectional views showing the several stages in the formation of a composite bonded contact element, in accordance with the invention; and FIGURE 4 is a make-and-break contact produced by the procedure illustrated in FIGURES 1 to 3.

Referring to the drawing, a silver-cadmium oxide contact face member 11 and a copper backing member 12 are initially provided in aligned relation for producing a desired contact element. The members are provided in any convenient form, e.g., as cylindrical segments, previously cut or sheared from wires or rods. While members 11 and 12 are illustrated as having the same cross sections, it will be understood that they may be provided having different cross sections, as when it is desired to produce rivet contacts. Preferably, the surfaces of members 11 and 12 adapted to be bonded together are previously cleaned to assist in the formation of a secure bond therebetween.

The contact face member 11 is constituted of a homogeneous body of up to about 15% by weight cadmium oxide, the remaining portion being substantially silver. Typical contact body compositions consist essentially of 90% silver and 10% cadmium oxide.

Members 11 and 12 are placed within a die body 13 defining a compression chamber or recess 14 having a cross sectional area which is larger than the cross sections of either of members 11 and 12. A piston or plunger member 15 is received within the die body 13 and is driven by a suitable mechanism for rapidly subjecting the aligned contact members to high velocity impacts, in accordance with the invention.

As shown in FIGURES 2 and 3, upon actuating the plunger 15 the contact members 11 and 12 are compressed and rapidly distorted from their original configurations shown in FIGURE 2, to the configurations shown in FIGURE 3 determined by the configurattion of the recess 14 within the die body 13. During such compression a substantially permanent bond is formed between members 11 and 12 across the entire inter-facial surface 16 therebetween.

It will be understood that the pressures and velocities of the ram or header utilized to actuate the plunger 15 may be varied, so long as the plunger compresses the contact members with a force of at least 1 ton per square inch, and is applied at a rate of at least 10 inches per second. Higher pressures and velocities up to, for example, 100 inches per second are included within the scope of the present invention and are limited only by available mechanisms and the desires of the user.

The bonded composite contact element, indicated at 17 in FIGURE 4, is thereafter suitably attached to a support member 18 by any conventional welding, brazing, soldering, or like procedure.

In one specific embodiment of the invention ¼ inch diameter discs of silver-cadmium oxide (90% silver—10% cadmium oxide) and copper were integrally bonded within a device of the character schematically illustrated in the drawing, by the application of a force of 20 tons per square inch, applied against the discs at a rate of 10 inches per second. The contact element produced thereby was not subject to separation or parting of the main silver-cadmium oxide body from the bonded surface, even after long use.

Hence, in accordance with the method of the present invention a procedure for readily and permanently bonding any number of silver-cadmium oxide contact faces to copper supporting bodies is provided. It will be understood that, since certain changes may be made in carrying out the above method without departing from the scope of the invention, it is intended that all matter contained in the above description shall be interpreted as illustrative and not in a limiting sense.

What is claimed is:

1. A method of forming an integral make-and-break electrical contact element comprising confining a silver-cadmium oxide contact face and a copper backing member in aligned relation within a compression chamber having a cross-sectional area in excess of the cross sections of said contact face and said copper backing member, and subjecting the aligned contact face and backing member to a compressive force of at least 1 ton per square inch, said force being rapidly applied to the aligned members at a velocity of at least 10 inches per second to weld the contact face and the backing member together and thereby form the integrally bonded composite contact element.

2. The method as defined in claim 1, in which said contact face is constituted of up to 15% by weight cadmium oxide, the balance consisting essentially of silver.

3. A method of forming an integral make-and-break electrical contact element comprising confining a silver-cadmium oxide contact face member containing up to 15% by weight cadmium oxide and a copper backing member, in aligned relation, within a compression chamber having a cross-sectional area in excess of the cross sections of such members, and subjecting the aligned contact face member and backing member to a compressive force of at least 1 ton per square inch, applied at a velocity of at least 10 inches per second, the resulting impact distorting the contact face and backing member into the configuration defined by said compression chamber and raising the temperature at the interface therebetween effecting welding of the members together to form the integrally bonded contact element.

References Cited in the file of this patent

UNITED STATES PATENTS

| | | |
|---|---|---|
| 2,382,338 | Shobert | Aug. 14, 1945 |
| 3,026,603 | Zysk et al. | Mar. 27, 1962 |
| 3,034,202 | Graves | May 15, 1962 |

FOREIGN PATENTS

| | | |
|---|---|---|
| 815,136 | Great Britain | June 17, 1959 |
| 1,122,812 | Germany | Jan. 25, 1962 |